United States Patent [19]
Galumbeck et al.

[11] Patent Number: 5,140,419
[45] Date of Patent: Aug. 18, 1992

[54] COMMUNICATIONS SYSTEM

[75] Inventors: Alan D. Galumbeck, Smyrna, Ga.; Russell D. N. MacKinnon, Montreal, Canada; Douglas G. Pincock; Frederick A. Reid, both of Halifax, Canada

[73] Assignee: The Weather Channel, Inc., Atlanta, Ga.

[21] Appl. No.: 454,143

[22] Filed: Dec. 21, 1989

Related U.S. Application Data

[63] Continuation-in-part of Ser. No. 323,089, Mar. 14, 1989, Pat. No. 4,916,539, which is a continuation of Ser. No. 155,997, Feb. 16, 1988, abandoned, which is a continuation-in-part of Ser. No. 487,244, Apr. 21, 1983, Pat. No. 4,725,886.

[51] Int. Cl.$^5$ .............................................. H04N 7/087
[52] U.S. Cl. ................................ 358/142; 340/825.44
[58] Field of Search ................... 358/84, 86, 141, 142, 358/143, 144, 145, 146, 147, 188; 340/721, 802, 825.07, 825.47, 825.5, 825.51, 825.52, 825.44, 825.53; 370/85, 86, 94; 455/32, 132, 133, 137, 140

[56] References Cited

U.S. PATENT DOCUMENTS

| | | | |
|---|---|---|---|
| 4,131,881 | 12/1978 | Robinson | 340/825.47 |
| 4,383,257 | 5/1983 | Giallanza et al. | 340/825.47 |
| 4,394,687 | 7/1983 | Hutt et al. | 358/147 |
| 4,429,385 | 1/1984 | Cichelli et al. | 358/146 |
| 4,430,731 | 2/1984 | Gimple et al. | 358/84 |
| 4,528,589 | 7/1985 | Block et al. | 358/84 |
| 4,725,886 | 2/1988 | Galumbeck et al. | 358/142 |
| 4,916,539 | 4/1990 | Galumbeck | 358/142 |

OTHER PUBLICATIONS

British Broadcasting Corporation, Independent Broadcasting Authority and British Radio Equipment Manufacturer's Association, "Broadcast Teletext Specification", Sep. 1974, United Kingdom (27 pp.).
Colormax Electronic Corp., "Colormax—Cable Captioning—16,000,000 Subs Need It!" (3 pp.).
Group W Satellite Communications, Westinghouse Broadcasting Co., Inc., "7609 Sat-A-Dat Decoder/Controller" (2 pp.).
Document entitled "Teletext Timing Chain Circuit," Aug. 1978 (9 pp.).
Document entitled "Teletext Video Processor," Dec. 1979 (9 pp.).
Document entitled "Teletext Acquisition and Control Circuit," Jun. 1980 (16 pp.).
Signetics Corp., "Philips I.C. Product Line Summary, May 1981." (pp. 1, 15 and 16).
Wegener Communications, Inc., "Asynchronous Data Transmission System—Series 2100 VIDATA" (2 pp.).
Zenith Radio Corporation, "VIRTEXT TM " (7 pp.).

Primary Examiner—John W. Shepperd
Attorney, Agent, or Firm—Kilpatrick & Cody

[57] ABSTRACT

A communications system having centralized management and multiply-hierarchical addressing schemes is disclosed. The system may be used in connection with supplying video, audio and data such as weather-related text, graphics, and information to affiliated receivers in a network for broadcast or display. Receivers may be addressed singly or in groups and allowed to determine their own addresses from information keyed, directly or indirectly, to a receiver characteristic such as the unit serial number. Lists of commands denominated "scripts" and transmitted to receivers are used for controlling the various modes or states of the receivers.

17 Claims, 3 Drawing Sheets

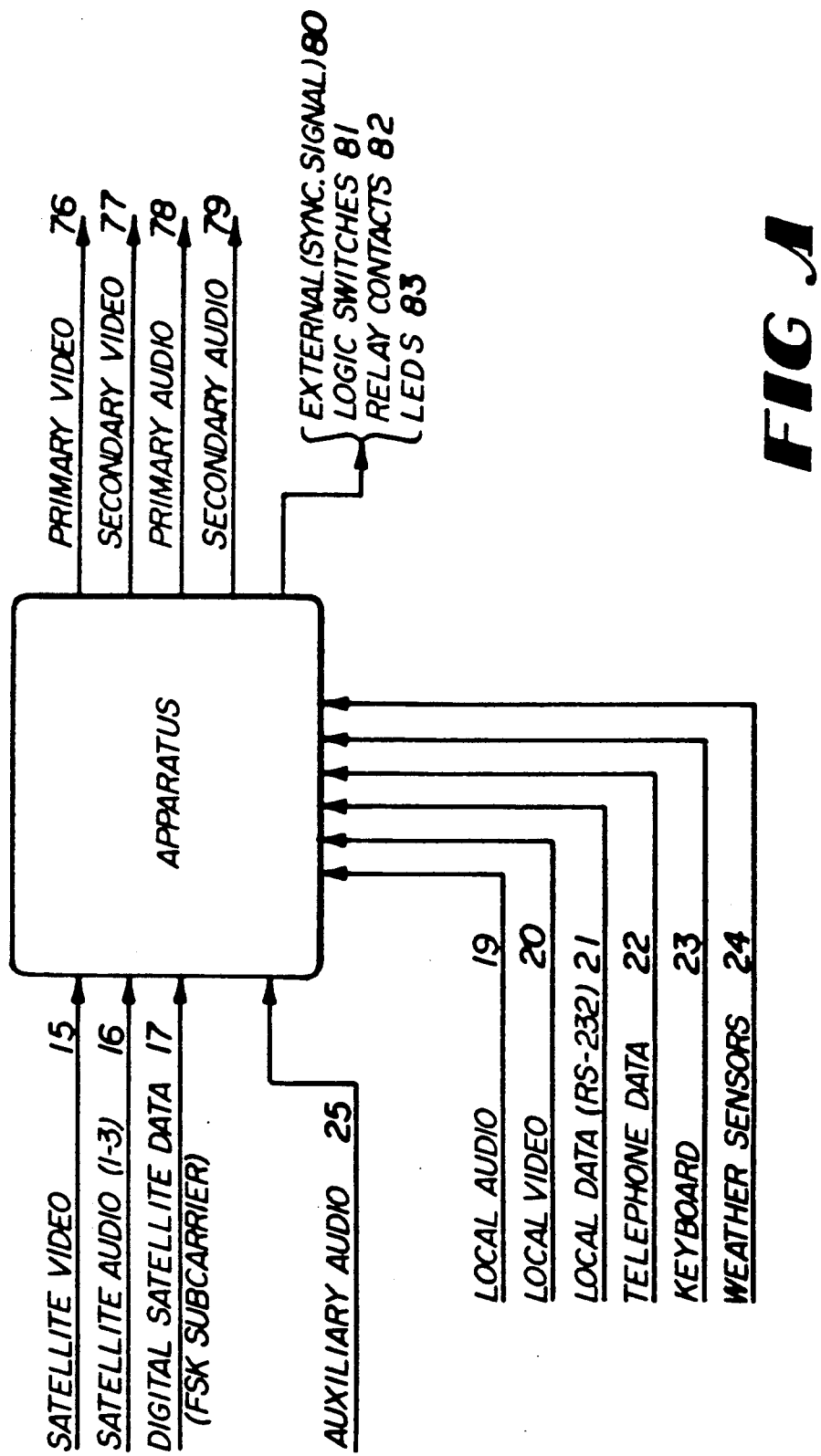

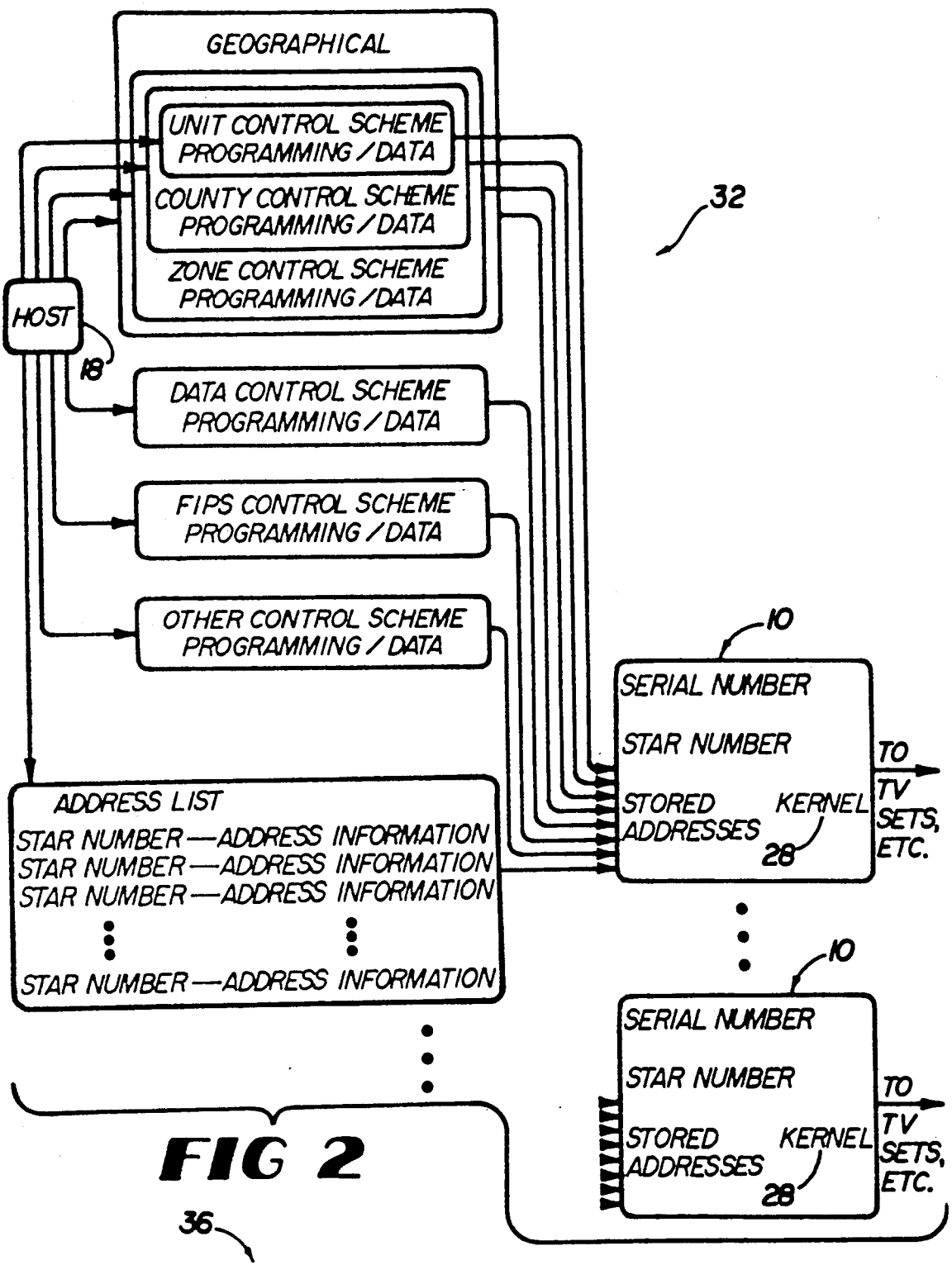
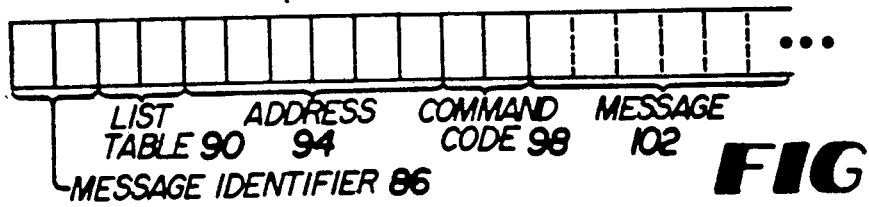

* COEXISTS WITH STAR IV MODE AT THE TIME OF THE ADVISORY OR WARNING

COMMUNICATIONS SYSTEM

CROSS-REFERENCE TO RELATED APPLICATIONS

This application is a continuation-in-part of pending U.S. patent application Ser. No. 07/323,089, filed Mar. 14, 1989, now U.S. Pat. No. 4,916,539 entitled "Communications System Having Receivers Which Can Be Addressed in Selected Classes," which application is a continuation of application Ser. No. 07/155,997, filed Feb. 16, 1988, now abandoned, which application is a continuation-in-part of application Ser. No. 487,244, now U.S. Pat. No. 4,725,886, filed Apr. 21, 1983, entitled "Communications System Having an Addressable Receiver," all of which applications are incorporated herein in their entireties by this reference.

FIELD OF THE INVENTION

This invention relates to a communications system for transmission of audio, video, data, and control signals to addressable remote receiving locations for retransmission under the command of the control signals.

BACKGROUND OF THE INVENTION

Transmission of audio and video signals to local receiving stations for immediate use, rebroadcast, or recordation for later broadcast is well-established practice, particularly in connection with distribution of television programming by various television networks. Use of data to generate characters which are displayed on a video screen over a single color background or another video signal background is also established practice.

However, expansion in the availability of data of both general and specific interest to various groups of data consumers and need for a system capable of efficiently transmitting such data to specific remote locations and to control the further broadcast, display, or transmission of such data at those locations have resulted in the need for audio, video, and data transmission systems with associated control capabilities not previously available.

U.S. Pat. No. 4,725,886, related to the present application as noted above, discloses and claims communications systems utilizing a novel hardware and software configuration simultaneously to transmit conventional video and audio program material together with data and control commands within the constraints of conventional television signal specifications to remote signal processors or receivers within the system. The remote signal processors or receivers receive the entire transmission and process it in a predetermined manner such that the data and the conventional video and audio signals may be utilized at the remote receivers, under network control, particularly for broadcast on local cable television systems.

These systems transmit, typically utilizing a satellite transponder, a first conventional video and audio television signal together with a digital data stream transmitted in the vertical blanking interval of the first video signal, or a subcarrier frequency or as otherwise appropriate. The data stream comprises digital control, address, and text data. A local unit may process and retransmit the first video (and audio) signal and, utilizing a character generator, store the digital text data and process it into a second ("satellite" text) video signal containing text for retransmission. In addition, the unit may receive and retransmit a third video (and audio) signal from a local source such as a video recorder, so that local commercials or other material may be displayed, and it provides a synchronization signal which may be input to the local source to synchronize signals from it with other video signals processed or generated by the unit. So that local cable operators may also be able to compose and display textual data, the unit may also receive digital data from a keyboard. This data, as well as data from local weather sensors, is processed by the unit into a fourth video signal containing text. On command from network control, the unit may select for output the first satellite video (and audio) signal, the third local video (and audio) signal, or a solid color background video signal, and may combine with any of these signals the second (satellite) and/or fourth local textual video signals.

The digital control and address data in the data stream of the first video signal control the operating states, or modes, of such units and determine the video, audio, and other outputs of a particular unit. Control data sent in the "Output Mode Control Word" ("OMCW") of the data stream determines, among other things, which video signals or combinations thereof will be presented and which audio signals will be presented, by controlling whether satellite video, local video, or character generator input will be processed and sent by the unit.

The address words of the data stream and the control words following them allow each such unit or a group of units to accept, store, and process particular text data and to display this text in a particular format. Thus, different digital text data may be stored by different units in groups of units for simultaneous presentation in response to the OMCW control data which controls timing of such presentation. Groups may be organized into higher level groups, so that these systems allow simultaneous control of units in a hierarchy of groups.

Units disclosed in U.S. Pat. No. 4,725,886 may be utilized for a network of local affiliates receiving transmissions from a single source dedicated to television programming related to weather information and advertising, financial data, sports, or other programming. Accordingly, the hierarchy of addressability utilized in embodiments disclosed in that document contemplates geographic organization of local units consistent with weather patterns. That document emphasizes, however, that the invention may also be adapted for transmission of entirely different programming and data for other types of commercial broadcasting and for non-commercial communications, including teletext-only communications, and aspects of the invention may be adapted to other uses such as various remote control networks.

A plurality of such units can be organized and addressed hierarchically for purposes of receiving and processing satellite video and teletext data according to a hierarchical address structure of four sub-fields: Service, Zone, County, and Unit. The address of a unit is set by positioning switches in the unit. The unit compares or matches sub-fields in addresses of received data one sub-field at a time to determine whether messages are addressed to it.

It has recently become useful, however, to arrange and control classes of units not necessarily according to geographical location or a hierarchical structure, but according to other criteria such as, for instance, a certain market such as a metropolitan area comprising portions of several counties or zones. Advertisers appreciate this capability as well as viewers who wish to receive the same information as others in their area without discrimination according to geographic boundaries or other hierarchical structures. Pending U.S. application Ser. No. 07/323,089, related to the present application as noted above, supplements the capabilities of the unit disclosed and claimed in U.S. Pat. No. 4,725,886 by allowing units to be controlled according to preselected classes independent of their hierarchical address structures. This additional capability results from changes to software in the units and the structure of data sent to them, as disclosed more fully in the specification of that application.

Other additional capabilities according to the invention disclosed in application Ser. No. 07/323,089 are the ability to cause units to enter into a "Crawl Alert" mode or state with satellite video and audio and with a solid color background in the bottom region of the screen across which messages may crawl, accompanied by intermittent audio signals. The invention also allows units to display remotely collected weather observations, such as those from local meteorological offices, if they sense loss of connection with their corresponding temperature probes, and to display crawl text corresponding to weather warning information stored in RAM. The invention further allows for the rainfall counter circuits to be easily reset or updated from the unit's keyboard.

SUMMARY OF THE INVENTION

The present invention represents a continuation of the development of a remotely controlled communications system. By providing a multiply-hierarchical addressing scheme, the invention allows programs, instructions, data, and addresses themselves to be transmitted by a source or system host to individual and groups of individual units at cable head-ends within the system. Information transmitted by the host controls the operational modes of the various units, permitting centralized management of the local broadcasts. Where communications systems disclosed in the parent applications referenced above have utilized a relatively "dumb" terminal approach or videotext/host processor philosophy, the present invention includes a "smart" peripheral.

The hardware which may be used in connection with the invention is modular in design to allow field implementation of hardware upgrades and includes fewer components, reducing both the frequency and cost of repairs. The software which may be used in connection with the present system also may be modular, with much of the system software (programs, scripts, lists, and data, more fully discussed below) capable of being sent to units via satellite link. The present invention is capable of identifying modified format videotext pages of the type disclosed in application Ser. No. 07/323,089, confirming the address and, if the address is valid, storing the pages as text pages of the type disclosed herein. If appropriately configured, the present system also can use these modified videotext pages, the accompanying control word, and page attribute specifications to emulate the display of the system disclosed in application Ser. No. 07/323,089.

The present invention is capable of supporting, processing, and controlling signals comprising satellite video, satellite audio, digital satellite data, local audio, local video, local data, telephone data, keyboard input, and weather sensor inputs. The satellite data input accepts preprocessed alpha-numerics in the World Meteorological Organization (WMO) format, alpha-numerics in a tabular format, graphics primitives, raster graphics, modified format videotext as discussed above, clock information, programs, lists, and scripts. The keyboard input provides only local crawl message text and permits alteration of certain configuration table parameters held in EEPROM. The RS-232 port (local data) allows for the input of both text and raster graphics in an appropriate format. If the cable head-end is remote from the cable operator, the modem allows input of both text and graphics data via telephone.

The local digital input is assigned a portion of the on-board RAM, with display of the input controlled either in real time or by script from the system host. The unit also permits the cable operator to use a video playback unit for inserting local video and audio into a broadcast. This device is controlled either in real time or by script from the system host. When the local inputs are active the unit treats the input in the same manner as satellite input, thus allowing the system host to maintain control.

Different instruction types may be downloaded from the data subcarrier or via the RS-232/modem ports, including primitives, programs, lists, and scripts. Each of these instruction types is described briefly as follows:

1. Primitives

Primitives are additions or deletions to the basic operating set (known as "the kernel") which are stored in the volatile memory. These additions or deletions must be consistent and continuously transmitted across the network.

2. Programs

Programs specify such items as memory allocation, system operations, and system configuration, and consist of program modules. These modules must be consistent and continuously transmitted across the network.

3. Lists

Indexed address lists are downloaded periodically from the system host. The system host maintains a "list table" which relates the index to a characteristic of each unit such as its serial number. This list table is periodically sent from the host and permits each unit to extract its own addresses. Configuration data may be downloaded periodically using either the index or any other of the address list items. From the addresses the unit is able to classify its individual data requirements and identify its individual instructions. Operational lists addressed to individual units or groups of units contain the specific lists of National Weather Service (NWS) messages. These lists are addressable both to the individual unit and to groups of units as defined by the hierarchical addresses. Error checking on downloaded operational lists also may be performed.

4. Scripts

Scripts are lists of commands and can be addressed to either individual units or groups of units. Scripts are the specific instructions for the production of both text and composite graphic products, the order of display for planned sequences, and the commands to display. Realtime control words are specialized one word scripts and may have priority on the network and when received by the units. The host may assign priorities other than the above upon instruction, however.

The embodiment of the invention described herein may be utilized for a network of local affiliates receiving transmissions from a single source or host dedicated to television programming relating to weather, financial, sports, advertising, or program information. The invention may also be adapted to use for transmission of entirely different programming and data for other types of commercial broadcasting, including teletext only communications, and aspects of the invention may be adapted to other uses such as various remote control networks.

BRIEF DESCRIPTION OF THE DRAWINGS

FIG. 1 represents a block diagram of the inputs to and outputs from the receiver/processor apparatus which may be used in connection with the present invention.

FIG. 2 is a block diagram of the system of the present invention illustrating a multiply-hierarchical addressing scheme which may be used in connection with the system.

FIG. 3 is a diagram of a portion of a data framing scheme which may be used in connection with the system of the present invention.

DETAILED DESCRIPTION OF THE DRAWINGS

A. Inputs

Figure 4A:
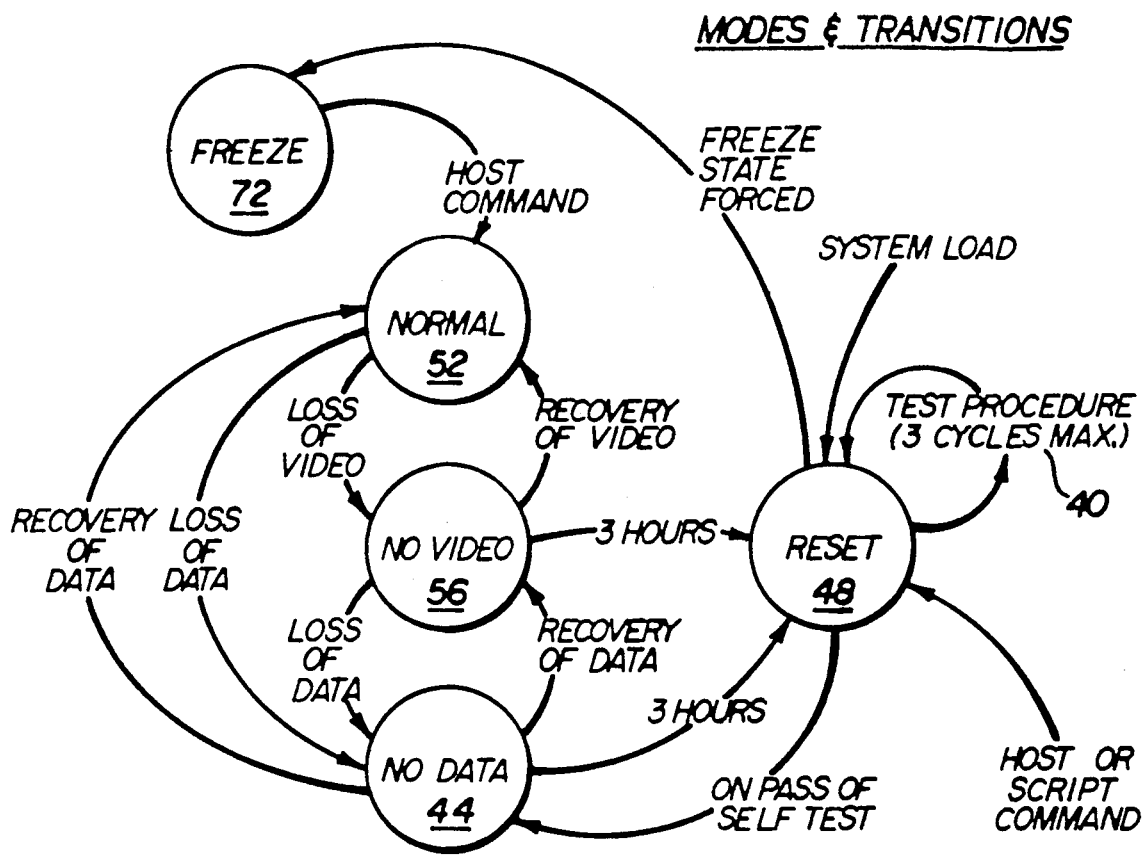
FIGS. 4A and 4B are flow charts illustrating operational modes of the receiver/processor apparatus of FIG. 1 which may be used in connection with the present invention.

FIG. 1 details the inputs to and outputs from the receiver/processor apparatus 10 which may be used in connection with the system 14 (FIG. 2) of the present invention. Apparatus 10 accepts satellite video 15, up to three satellite audio 16, and digital satellite data 17 signals as input from a satellite receiver and/or descrambler and is capable of demodulating a frequency shift keyed (FSK) data subcarrier signal to obtain the digital satellite data. Because apparatus 10 usually is remotely located from the system host 18, transmission of signals 15-17 may be via satellite.

Satellite data signals 17 may include preprocessed alpha-numerics in the World Meteorological Organization (WMO) format, alpha-numerics in a tabular format, graphics primitives, raster graphics, modified format videotext as discussed earlier, clock, programs, lists, and scripts. The system host 18 also performs initial processing of any NWS data transmitted by putting NWS data elements into fixed width columns in a consistent format, although the narrative text of NWS messages is sent to apparatus 10 unprocessed and requires formatting and pagination at the apparatus 10. Information pertaining to almanac screens, such as tide data and sunrise/sunset information, is processed at the host 18 and sent to apparatus 10 in a format similar to preprocessed NWS data.

Apparatus 10 also accepts inputs from local sources, including local audio 19, local video 20, local data 21, telephone data 22, keyboard input 23, (optional) weather sensor input 24, and auxiliary audio 25 signals. An asynchronous RS-232 port may be used for input of local data signals 21 at rates of 300, 1200, 2400, or 4800 Baud. Telephone data signals 22 may be input via the public switched telephone network from a remote 300 Baud serial asynchronous modem, and apparatus 10, which incorporates its own 300 Baud modem, may be configured to allow incoming telephone calls to preempt keyboard input 23 if desired. Apparatus 10 may accept both raster graphics and data through the RS-232 and modem ports, and these ports are capable of accepting software to implement, for example, self-diagnostics and software configurable adjustments under remote control. Input via keyboard 23 is limited to local "Crawl Message" text and instructions to alter selected configuration table parameters contained in RAM. By accepting weather sensor input signals 24, apparatus 10 permits local weather information and measurements to be input directly to individual receivers. Weather sensor data frequently input to apparatus 10 include temperature, humidity, wind direction and speed, rainfall, and barometric pressure information. Apparatus 10 also is capable of calculating and displaying maximum (gust) and average wind speeds and wind chill temperatures.

Apparatus 10 reacts to local input signals 19-24, auxiliary audio signals 25, and satellite input signals 15-17 similarly. Local data input signals 21, for example, are assigned a portion of the RAM of apparatus 10 and displayed under real time or script control of host 18. This centralized control capability also permits a cable affiliate to use a video playback unit for inserting local video and audio into a broadcast while maintaining control of the broadcast itself at host 18.

B. Instruction Types

Apparatus 10 may download different instruction types, including primitives, programs, lists, and scripts, from the data subcarrier of digital satellite data signal 17 or via the RS-232 or modem ports used respectively in connection with local data 21 and telephone data 22 signals. Primitives represent additions to or deletions from the basic operating set of instructions ("the kernel" 28) and are stored in the volatile memory of apparatus 10. Programs, which must be consistent across the network of apparatus 10 and continuously transmitted by host 18, specify such items as memory allocation, system operations, and system configuration. At least two categories of lists also may be used in connection with the present invention, including address lists and operational lists. Address lists, suitably indexed as part of the system's hierarchical addressing scheme 32, and which permit each apparatus 10 to extract its own index or "STAR number," may be downloaded periodically from host 18. Host 18 maintains a table which relates the STAR number to the serial number of each apparatus 10. Configuration data may be capable of being downloaded periodically using the serial number, the STAR number, or any other of the address list items. By using the serial number of each apparatus 10 solely to convey the STAR number, the host 18 may easily allow for substitution of a new apparatus 10 should a unit failure occur. From the addresses apparatus 10 is able to classify its individual data requirements and identify its individual instructions. Operational lists, addressable both to individual and groups of individual apparatus 10 as defined by the hierarchical addresses, contain the specific lists of NWS messages.

Scripts, finally, are lists of commands addressable either to individual or groups of apparatus 10. These command lists, which may be nested, control the flow of operations for apparatus 10 when executed by a script processor and represent specific instructions for the production of both text and composite graphic products, ordering the display for planned sequences, and commanding the display. Real-time control words, which have priority on the network and when received by apparatus 10, are specialized one word scripts.

Message frames 36 similar to that shown in FIG. 3 containing downloadable program modules, if correctly received at the apparatus 10 and identified as having a different version number from the currently operating module, are stored in RAM. Frames incorrectly received or identified as having the current version number are rejected, and a new module is marked as unusable until all frames are correctly received. On subsequent transmissions of a particular module, message frames previously received incorrectly are stored (assuming they are correctly received and contain the same version number as previously stored frames) until such time as a complete program module is available at the apparatus 10. Once the complete program is available, the new module is available for updating the operational software used in the apparatus 10.

The process of updating the operation software commences immediately after receipt of a complete program unless the apparatus 10 previously has received a command inhibiting automatic program module updates. Such a command may be expressed as "INHIBIT-AUTO-UPDATE." If automatic updates have been inhibited and a new module is available, the new module is activated only upon receipt of a "RESET" command or an "ALLOW-AUTO-UPDATE" command from the host 18.

C. Graphics, Text, and Aloha-Numerics

Apparatus 10 accepts digitized raster graphics and graphic primitives from the data subcarrier and supports composite graphics generated from both types of graphics information. Run length encoded raster images in an appropriate format may be received through the data subcarrier for storage and display and, upon receipt, assigned a resolution and color table and, if a map, a geographic center, scale, and projection. Typical map image projections include Lambert Conformal, Oblique Stereographic, Mercator, and Pseudo G.0.E.S. One version of the image may be denoted as the "master" version containing the original instruction set and may not be easily subject to editing or deletion. A second or working version of the image may be generated at apparatus 10 to allow merging of the image with data overlays. In addition, affiliates having equipment producing raster images compatible with the format accepted by apparatus 10 may input images into certain sections of memory.

Apparatus 10 is capable of constructing graphics locally from graphic primitives, with each graphic having a center, resolution, and associated color table. These local graphics may occupy all or part of the display and may be of high (768×480), medium (384×480), or low (384×240) resolution. Graphics instructions accepted by apparatus 10 allow movement, or navigation, of various colored shapes over a background which may be transparent, of solid color, or graduated. The graphics instructions can be generated either in real time ("on the fly") or stored in compressed raster format for later retrieval, and may specify a page number and name for each graphic to be stored. Associated with each page may be a current and master image version, with the current version including any required variable information such as data overlays.

Run length encoded graphic images whose uncompressed display size greatly exceeds the screen size ("supergraphics") also may be received by apparatus 10 and, if desired, stored in RAM. Apparatus 10 is able to extract a portion of the large scale image, as the image is received, based upon its physical location (i.e. the latitude and longitude of the apparatus 10) or other given data and display that portion on the screen. If extraction is based upon latitude and longitude information, apparatus 10 positions its own geographic location at the center of the displayed image. Requirements for normal, full screen graphics images also apply to supergraphics.

Apparatus 10 supports placement of characters over graphics pages, satellite video, and graduated and solid color backgrounds. A full array of geometric shapes may be used in connection with the display, including lines, circles, squares, rectangles, triangles, ellipses, and polygons, all of which may be varied in terms of size, orientation, and shading. The apparatus 10 also permits display of a video window in a graphic or graphic series and partial or complete masking of video by graphics.

Apparatus 10 accepts text information from system host 18, follows the associated instructions, and produces text overlays. Each text page has an associated name and memory page number. A remote keyboard adaptor, such as a Tandy RS-102 laptop computer, may serve as an interface between a user and the RS-232 or modem ports and allow scheduling of local crawl messages, and keyboard text may include entry and editing of crawl messages and modifications of selected configuration table parameters. Scrolling text display (both horizontally and vertically) is provided within the system by dividing the broadcast screen into regions and scrolling by scan line. Downloading script-callable font masters from host 18 transmissions allows variation in text size, typeface, borders, drop shadows, spacing, slanting, and color.

For pre-processed NWS data bulletins each apparatus 10 may search and select the bulletins for records of interest and construct a data overlay to be merged with appropriate text and icons for display. The data overlay may have a center, planned layout, and resolution. For text data overlays over base maps, apparatus 10 converts table-supplied latitude and longitude information for pertinent locations into two-dimensional coordinates for on-screen display. Data positioning may be dependent upon the map scale, projection used, and, in the case of supergraphics, the latitude/longitude rectangle extracted from the transmitted image. If an apparatus 10 receives a weather warning or advisory bulletin of interest, a full copy of the text over a solid background with an audio alarm may be produced.

D. Programming and Addressing

Each apparatus 10, as noted above, includes a kernel 28 comprising a basic operating instruction set residing in its PROM. Apparatus 10 downloads the remainder of its instruction sets, which include programs controlling fundamental system operations, memory allocation, run-time diagnostics, graphics function, message type identification, address checking, and control mode establishment. Operational configuration data such as configuration settings, phone numbers, and passwords may reside in an EEPROM portion of the main memory of apparatus 10 accessible by the host 18. Programs may be modular to allow for real-time replacement of modules.

Each apparatus 10 also includes a machine and script-readable serial number. Continuously updatable hierarchical addresses may be keyed, directly or indirectly, to the individual serial numbers, and lists of items to be performed or omitted may be installed according to groupings determined by the addresses.

A script, analogous to or consisting of a high-level programming language, is a list of instructions to be performed by an apparatus 10 or hierarchical set of apparatus 10 either upon receipt of a real-time control word, at predetermined times, or upon arrival of specific data. The script language permits, among other things: access to internal data, including available weather sensor data; flow control of programs via "IF-THEN-ELSE" type compound conditional statement; nesting of script command sets by means of subroutine calls; and testing of various items such as signal presence, status or operating modes, arbitrary image presence, weather sensor presence and outputs, date and time information, and database data presence. Initially, script command sets are input to apparatus 10 only through transmission from host 18. Software resident at system host 18 provides script entry and editing using the host 18 facilities, script syntax checking, and pseudo-compilation to allow a "token" command set to be transmitted to various apparatus 10. Implementation of software at apparatus 10 allows such pseudo-compiled scripts to be entered through the RS-232 and modem ports as well.

Time information keyed to Greenwich Mean Time (GMT) may be provided to apparatus 10 via the satellite link with host 18. Clock programming of apparatus 10 confirms the time received, converts it to local time and date for on-screen display using a downloadable GMT offset figure in its configuration database, and marks locally acquired products or information with the date and time received. Time-zone hierarchy may be used to address apparatus 10 when providing the GMT offset figure.

Various password levels may be used to maintain the integrity of the overall system when it is accessed via the RS-232 or modem ports. A privileged password may be assigned to the host 18, allowing the system host 18 to access all configuration data, memory, password modification, run-time diagnostics, error log, and other information related to each apparatus 10. Non-privileged passwords, on the other hand, may be assigned to each affiliate and permit limited access to configuration settings and to a variable portion of RAM in the corresponding apparatus 10 made accessible by host 18. The present system allows affiliates to alter their non-privileged passwords at any time.

Addressing of apparatus 10 is hierarchical and may be installed from the host 18 by assigning logical addressing schemes to the machine readable serial number on the backplane of each apparatus 10. The present system supports at least four addressing schemes, including the format address scheme disclosed in application Ser. No. 07/323,089 and U.S. Pat. No. 4,725,886, other geographic addressing of apparatus 10, addressing using the state and county Federal Information Processing Standard (FIPS) code assigned by the Department of Commerce as a hierarchy, and addressing using designated market area (DMA) addresses. Additional addressing schemes may be used, however, including non-geographic schemes, and multiple addresses may be assigned within each scheme.

The present invention specifically contemplates addressing of both alpha-numeric and graphics (raster and graphic primitive) products and the inclusion of as many as several thousand apparatus 10 in the overall system. The present system also supports separate addressing of two thousand weather forecast and 1024 DMA areas in the United States, significantly more than the 750 forecast and 300 DMA areas presently in existence, and more may be supported if necessary. Forecast areas also may be subdivided into states, counties and subcounties. For affiliates whose broadcast areas include more than one forecast or DMA area, the multiple addressing scheme permits receipt by the corresponding apparatus 10 of multiple regional forecasts.

E. Modes

Figure 4B:
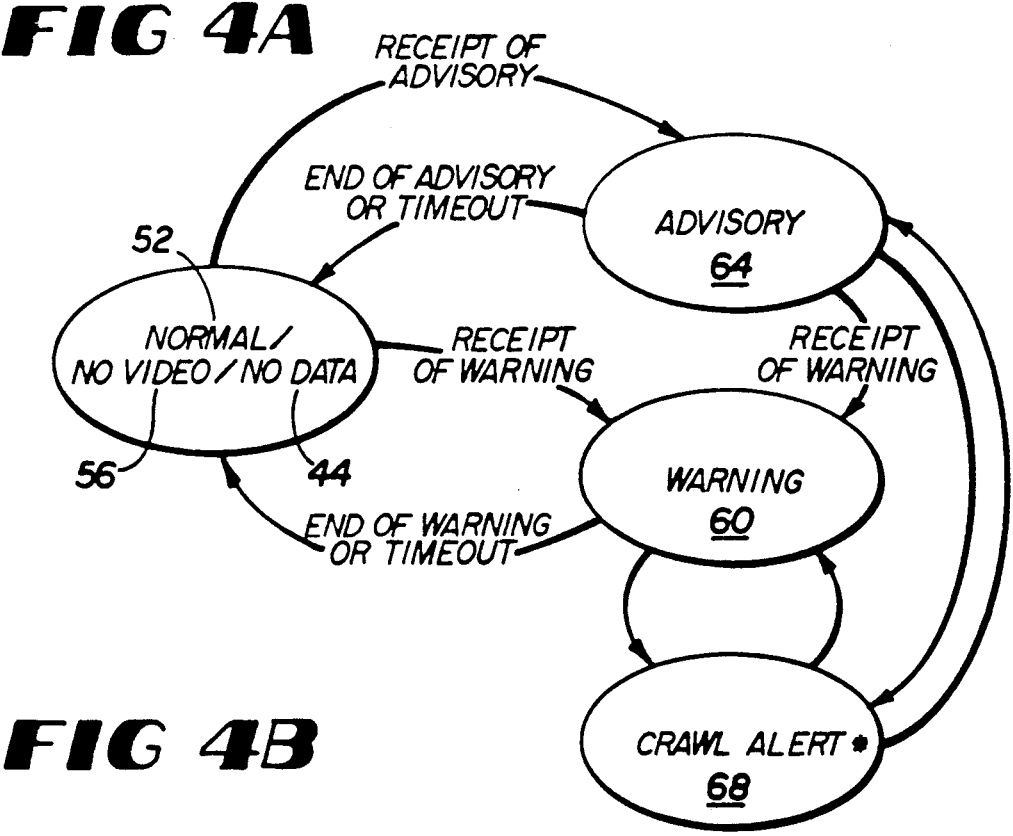

When power is applied to apparatus 10 it enters into a TEST procedure 40 (FIG. 4) designed to validate the RAM and clock. If these parameters are validated, apparatus 10 enters NODATA mode 44. Otherwise, apparatus 10 enters RESET mode 48 and repeats the TEST procedure 40.

The typical operating mode of apparatus 10 is denominated NORMAL mode 52. NORMAL mode 52 is maintained until apparatus 10 fails to receive a valid data packet for a preselected period of time (e.g. one minute), if satellite video is lost for a number of consecutive video fields (e.g. forty-five), or if data are received to force the apparatus 10 to enter another mode. Host 18 retains control over apparatus 10 in this mode, although the host may forward control to local script files if desired. Control Words issued while NORMAL mode 52 is maintained allow for independently controllable video and audio outputs including, but not necessarily limited to:

1. Satellite video and primary audio
2. Satellite video and secondary audio
3. Satellite video and tertiary audio
4. Data frame(s) and primary audio
5. Data frame(s) and secondary audio
6. Data frame(s) and tertiary audio
7. Satellite video, with data frame(s) overlaid and primary audio
8. Satellite video, with data frame(s) overlaid and secondary audio
9 Satellite video, with data frame(s) overlaid and tertiary audio
10. Satellite video, with local audio
11. Satellite video, overlaid with data frame(s) and local audio
12. Local video with local audio
13. Local video with primary audio
14. Local video with secondary audio
15. Local video with tertiary audio
16. Data frame(s) with local audio NOVIDEO mode 56 is entered if apparatus 10 fails to receive satellite video for a number of consecutive video fields (e.g. forty-five). Entry into NOVIDEO mode 56 forces apparatus 10 to execute a suitably designed script. NOVIDEO mode 56 exits to NORMAL mode 52 when satellite video is restored for the appropriate period referenced above and data is present. If apparatus 10 remains in NOVIDEO mode 56 for a preselected length of time (e.g. three hours), RESET mode 48 is entered.

By definition, NOVIDEO mode 56 requires that satellite data remain present, and may occur without loss of satellite audio. Should NOVIDEO mode 56 be entered with satellite audio signals present, apparatus 10 detects the audio, chooses the script most applicable, and follows the instruction set. The applicable script file may include a command to enter RESET mode 48.

Outputs valid during NOVIDEO mode 56 include:
A) with satellite audio unavailable:
1. Local video with local audio
2. Data frame(s) with local audio
B) with satellite audio available:
1. Local video with local audio
2. Data frame(s) with local audio
3. Local video with primary audio
4. Local video with secondary audio
5. Local video with tertiary audio In NOVIDEO mode 56 apparatus 10 continues to display local weather values. Diagnostics resident at apparatus 10 may be used to institute telephone contact with the system host 18 after detecting the NOVIDEO mode 56 condition for a particular length of time (e.g. two hours and forty-five minutes).

NODATA mode 44 is entered when apparatus 10 fails to receive continuous clock or data signals for, e.g., one second, and after successfully exiting RESET mode 48. When apparatus 10 enters NODATA mode 44 it is forced to execute an appropriately designed script. A supervisory layer script calling for the activation of default video and audio allows for the start-up scenario described above.

NODATA mode 44 is exited to either NOVIDEO or NORMAL modes 56 or 52 respectively when apparatus 10 receives a number (e.g. sixty) of consecutive error-free frames and when a complete program is resident in memory. After a predetermined time in NODATA mode 44, e.g. three hours, apparatus 10 enters RESET mode 48.

In some cases while in NODATA mode 44 apparatus 10 may continue to receive either or both of satellite video and audio. In such cases apparatus 10 detects the signals present and chooses a script file based upon available information. NODATA mode 44 allows a default script containing a text page to be executed to provide coverage during the system reload after a successful exit from RESET mode 48. Valid NODATA mode 44 outputs include:
(A) with satellite video and audio available:
1. Satellite video and primary audio
2. Satellite video and secondary audio
3. Satellite video and tertiary audio
4. Data frame(s) and primary audio
5. Data frame(s) and secondary audio
6. Data frame(s) and tertiary audio
7. Satellite video, with data frame(s) overlaid and primary audio
8. Satellite video, with data frame(s) overlaid and secondary audio
9. Satellite video, with data frame(s) overlaid and tertiary audio
10. Local video with local audio
11. Local video with primary audio
12. Local video with secondary audio
13. Local video with tertiary audio
14. Data frame(s) with local audio
15. Satellite video, with local audio
16. Satellite video, overlaid with data frame(s) and local audio
(B) with only satellite video available:
1. Local video with local audio
2. Data frame(s) with local audio
3. Local video with primary audio
4. Local video with secondary audio
5. Local video with tertiary audio
6. Data frame(s) with primary audio
7. Data frame(s) with secondary audio
8. Data frame(s) with tertiary audio
(C) with satellite video and audio unavailable:
1. Local video with local audio
2. Local video, overlaid with data frame(s) and local audio
3. Data frame(s) with local audio Apparatus 10 enters WARNING mode 60 upon receipt of a valid weather warning message for an area within its broadcast region as determined by the apparatus 10 address and the warning message header. WARNING mode 60 is usually entered from NORMAL mode 52, ADVISORY mode 64, or CRAWL ALERT mode 68. In WARNING mode 60 the customary system programming is preempted although it continues to run as a background task so that when WARNING mode 60 is exited the display will return as if the mode had not been encountered), the display background is colored, and the full text of the NWS issued weather warning is displayed in a scrolling text format. This visual display is accompanied with an audible warning alert tone such as a series of beeps. In addition, the contacts for all channel alert equipment are activated and local weather sensors or the latest local weather observation, along with day, date, and time, may be displayed in a second region of the display. WARNING mode 60 typically is maintained for two complete presentations of the NWS text or until the warning is cancelled by host 18, after which the mode is exited into either CRAWL ALERT mode 68, NORMAL mode 52, NOVIDEO mode 56, or NODATA mode 44. Maintenance of either WARNING or CRAWL ALERT mode 60 or 68 respectively for more than a predetermined maximum length of time based on the same downlinked message causes apparatus 10 to attempt to contact host 18 via the telephone line. The system host 18 can then alter the mode of apparatus 10 either by issuing a new message or by commanding entry of RESET mode 48. WARNING mode 60 may coexist with both NOVIDEO and NODATA modes 56 and 44 respectively.

ADVISORY mode 64 is entered, typically from NORMAL mode 52, WARNING mode 60, or CRAWL ALERT mode 68, when an apparatus 10 receives a valid weather advisory message for an area of interest, again determined by the apparatus 10 address and the message header. In ADVISORY mode 64 regular programming is preempted (although, once again, it continues to run as a background task so that when ADVISORY mode 64 is exited the display will return as if the mode had not been encountered), the display background is colored, and the full text of the NWS issued weather advisory is displayed in a scrolling text format. This visual display may be accompanied with an audible warning alert tone such as a series of beeps should an appropriate command be issued by the script file. In addition, the contacts for all channel alert equipment are activated, and local weather sensor information or the latest weather observations may be displayed in the crawl space. ADVISORY mode 64 generally is maintained for two complete presentations of the NWS text or until cancellation of the advisory message by host 18, after which the mode is exited. ADVISORY mode 64 does not preempt entry into WARNING mode 60.

ADVISORY mode 64 normally exits into CRAWL ALERT mode 68 or, if the NWS weather advisory is cancelled by receipt of an updated message or after a certain period of time has elapsed, into one of NORMAL, NOVIDEO, or NODATA modes 52, 56, or 44. Should apparatus 10 remain in ADVISORY or CRAWL ALERT mode 64 or 68 respectively for too long a period of time due to the same message, apparatus 10 may attempt to inform host 18 of its status via telephone. The system host 18 can alter the mode of the apparatus 10 by either issuing a new authority or forcing entry into RESET mode 48. ADVISORY mode 64 supports the functions of NOVIDEO and NODATA modes, respectively 56 and 44.

CRAWL ALERT mode 68 is entered from either WARNING mode 60 or ADVISORY mode 64 and consists of a text message displayed over video or graphics and moving horizontally, or "crawling," across the screen. The crawl message normally appears at the bottom of the display, although the script file generating the alert can position the message in any region of the screen. Apparatus 10 generates the crawl message by parsing its type (e.g. advisory or warning) and nature (e.g. tornado, hurricane, etc.), and the valid times and locations from the NWS message. To this apparatus 10 adds the time the next full text of the NWS message will be displayed and ensures the current time is displayed on screen. The script file is able to identify if the message is a warning or an advisory and control the time between full text displays, the text color, the system audio, and whether closures for either all channel alert or cable control equipment are to be activated. CRAWL ALERT mode 68 has priority over local video. However, if local video is being displayed when CRAWL ALERT mode 68 is entered, the crawl message will be delayed until local video has ceased.

CRAWL ALERT mode 68 supports all functions of NORMAL 52, NOVIDEO 56, and NODATA 44 modes and is normally exited to either WARNING or ADVISORY mode 60 or 64 respectively at the completion of each display cycle (typically every five to ten minutes as determined in the script file). CRAWL ALERT mode 68 can, however, exit to NORMAL mode 52 when the valid time of the warning or advisory has expired or when a cancellation message is received. Upon receipt of a message upgrading the seriousness of the situation CRAWL ALERT mode 68 is preempted by whatever mode change is forced upon apparatus 10 by host 18 and a new crawl message generated. If an apparatus 10 remains in CRAWL ALERT mode 68 for more than a specified maximum length of time due to the same alert message, apparatus 10 may attempt to contact host 18 via the telephone line and host 18 can alter the mode of apparatus 10 by issuing a new authorization for CRAWL ALERT mode 68 or by forcing apparatus 10 to enter RESET mode 48.

RESET mode 48 may be invoked upon receipt of a reset command from host 18 or a script, by manually pushing a reset button located on the CPU board of apparatus 10, following loss of only AC power to apparatus 10, or following change of critical configuration parameters. A sixth method of entering RESET mode 48 is following loss of both AC power and the DC battery back-up, when a "cold" boot is performed and RAM contents have been destroyed.

Upon entering RESET mode 48 apparatus 10 is placed off-line and default video and audio appear at its output. RAM contents are checked as well as the clock chip "power fail detect" line. If valid software is found, a start-up TEST procedure 40 is conducted (i.e. a "warm boot"). If resident software is determined to be invalid, apparatus 10 waits to receive valid software from the host 18. When valid software has been received, apparatus 10 reexecutes the TEST procedure 40 and, upon successful completion, enter NODATA mode 44. Failure to complete TEST procedure 40 causes recycling of the procedure as discussed below.

FREEZE mode 72 occurs as a result of a command issued by host 18 or through communications access through use of a privileged password and results in a single page of graphics sent with the command being displayed until apparatus 10 is instructed to return to NORMAL mode 52. FREEZE mode 72 survives both a cold and warm boot. The mode of apparatus 10 after successfully completing the start-up TEST procedures 40 is dependent on the internal setting of a "freeze" flag within the EEPROM.

TEST procedures 40, including memory, clock, configuration, and system tests, are performed upon start-up of apparatus 10. If appropriate parameters are within acceptable limits, apparatus 10 enters NODATA mode 44; otherwise, apparatus 10 enters RESET mode 48 and recycle through TEST procedures 40. After some number of consecutive test/reset cycles, typically three, apparatus 10 performs an orderly shut down and communicate its status to host 18. This status can be modified either by a cold boot or upon entering the INTERACTIVE-TEST portion of TEST procedures 40.

In the SELF-TEST portion of TEST procedures 40 the main functions of each of the boards in apparatus 10 may be tested, preferably at regular intervals of no more than six hours. SELF-TEST is designed to run in a background state so as not to interfere with operation of apparatus 10. Loss of AC power to or high internal ambient temperature of apparatus 10 causes a power supply shutdown and separate log entries. In addition, the absence or loss of both input and output signals and existence of differing results for consecutive executions of the same test may be detected and logged. Any apparatus 10 not satisfying predetermined specifications attempts to communicate the fact to host 18 via the telephone line and to transmit to the host 18 all stored SELF-TEST results for the past, e.g., thirty-five days. Routine SELF-TEST reports to host 18, scheduled for off-hour times, include current configuration of each apparatus 10, including serial number, battery levels, and notices of power failures and entry into modes other than NORMAL 52, WARNING 60, ADVISORY 64, FREEZE 72, or CRAWL ALERT 68. The INTERACTIVE-TEST portion of TEST procedures 40 can be entered either at the factory or via the communications ports while apparatus 10 is in the field. While in INTERACTIVE-TEST all SELF-TEST procedures can be accessed and the color output, including both text and graphics output, can be directed to the system host 18. Apparatus 10 passes satellite video and primary audio during this procedure, which runs as a foreground task entered and exited upon command from the modem port, unless otherwise instructed.

F. Outputs

Outputs of apparatus 10, as shown in FIG. 1, include primary and (optional) secondary video signals 76 and 77, primary and secondary audio signals 78 and 79, external (synchronization) signal 80, logic switches 81, relay contacts 82, and LEDs 83. 10 External signal 80 provides an isolated source of composite signal generated from the satellite video 15 and may be used for synchronizing local video sources to be of identical time framing. Logic switches 81 and relay contacts 82 are intended to be operated by script command, and LEDs 83 may be under hardware or software control.

G. Input Message Formats

FIG. 3 details the frame format for messages (other than those in a modified format of that described in application Ser. No. 07/323,089) to be received by apparatus 10. Message frame 36 includes a message identifier 86 specifying the message type, a list table entry number 90 (see also FIG. 2) for address comparison, an address 94 used in identifying the receiving individual or groups of apparatus 10, a command code 98, and the message 102. Message identifier 86 and command code 98 typically comprise two ASCII bytes, address 94 typically six ASCII bytes, and list table entry number 90 typically two bytes in binary form. Message 102 may be of variable length.

Message identifiers 86 include such items as script management (SM), real-time control directives (RT), software management messages (SW), tabular data (TA), image management messages (IM), font selection messages (FS), crawl management messages (CR), schedule activation (AC) and deactivation (DE), crawl scheduling (SC), crawl selection (CU), list management messages (LI), clock management messages (CU), and end of transmission messages (IO). An "S3" message identifier indicates that the associated message is in a format disclosed in application Ser. No. 07/323,089. Furthermore, because apparatus 10 may transmit messages to host 18 in a format similar to message frame 36, message identifiers for such communications may include health monitor messages (HM) and radar messages (RA).

Command codes 98 identify the action to be performed by the receiving apparatus 10 and include, for example, such indicators as script information present (SC) and script deletion (DE) within the message identifier "SM." Thus, a sample message frame 36 for deleting a script denoted as "script-name" may be written as SM a# aaaaaa DE script-name where "SM" is the message identifier 86, "a#" is the list entry table number 90, "aaaaaa" is the address 94, "DE" is the command code 98, and "script-name" is message 102. The blank spaces between elements 86, 90, 94, 98, and 102 in the sample message have been inserted for convenience of the reader only and need not be sent as part of the overall message.

The various command codes 98 and corresponding messages 102, with the terms "STAR" and "STAR IV" referring to apparatus 10 and "PTT" referring to non-weather related programming which may be made available to affiliates, are listed in CHART 1.

| CHART 1 |
|---|

A.1.1. Script Management Messages
Two message types are received by the Script Manager of apparatus 10, the first of which may contain script data and the second of which may provide for a delete command.

SM a# aaaaaa    SC    script-name sequence-number last-frame-flag
                               script-data
                DE    script-name Script Data - SC

| Parameter | Start Byte | Byte Len. | Data Type | Description |
|---|---|---|---|---|
| scriptname | 13 | 18 | character | alphanumeric script name; maximum of 16 characters, NULL terminated. |
| seq_number | 31 | 2 | integer | message frame number |
| last_frame_flag | 33 | 2 | character | flag indicating the last message frame; 'E' = End of transmission, 'C' = More to follow; the flag is left-justified in its field. |
| scriptdata | 35 | 94 | variable | script data |

Notes:
1. The sequence-number starts at 1 for the first frame of the message and is incremented by 1 for each subsequent frame.
2. The last_frame_flag requires 2 bytes immediately following the sequence number. The first byte takes on the ASCII character E to indicate the end of transmission of the current message. For all other frames within the message, this byte must be ASCII C.
3. The remaining bytes within the frame are reserved for scriptdata. This field may contain 1 or more script commands, each command preceded by a 16 bit integer, indicating the length of the following command in bytes. The 16 bit length word is in binary format.

Delete Script - DE

| Parameter | Start Byte | Byte Len. | Data Type | Description |
|---|---|---|---|---|
| scriptname | 13 | 18 | character | alphanumeric script name; maximum of 16 |

-continued

CHART 1 characters; NULL terminated.

A.1.2 Real-Time Control Directives
RT a# aaaaaa CO authority#    SSST soriptname starttime
    SSSP scriptname
    SSLO scriptname
    SSAB scriptname
    SSEN mode text
    SSEX mode
    DISWAU switch_position
    DISWVI switch_position
    DISWDE switch_position device_num
    DISWRE switch_position
    EVSE eventname
    PTLO alias_name
    PTST
    RTCL CO identifies the message as real-time control.
The authority number is an integer with a valid range of 0 to 32767 which uniquely identifies the message so that apparatus 10 may detect and ignore the duplicate receipt of a directive.

Script Scheduling, Start Script - SSST

| Parameter | Start Byte | Byte Len. | Data Type | Description |
|---|---|---|---|---|
| scriptname | 19 | 18 | character | script name (left justified) |
| starttime | 37 | 20 | character | scheduled time for execution; the time is in the format: yyyy/mm/dd/hh:mm:ss |

Notes: 1. The start time is optional and specifies the absolute GMT time at which the script will begin execution.

Sript Scheduling, Start Special Script - SSSP

| Parameter | Start Byte | Byte Len. | Data Type | Description |
|---|---|---|---|---|
| scriptname | 19 | 18 | character | script name (left justified) |

Notes: 1. Special scripts share the display with NORMAL scripts. The special script, however, takes precedence in the event of conflicts.
2. Like NORMAL scripts, special scripts are preempted by NOVIDEO, NODATA, ADVISORY, WARNING, FREEZE and RESET.
3. Special scripts are also preempted by CRAWL ALERT.

Script Scheduling, Load Script - SSLO

| Parameter | Start Byte | Byte Len. | Data Type | Description |
|---|---|---|---|---|
| scriptname | 19 | 18 | character | script name (left justified) |

Script Scheduling, Abort Script - SSAB

| Parameter | Start Byte | Byte Len. | Data Type | Description |
|---|---|---|---|---|
| scriptname | 19 | 18 | character | script name (left justified) |

Script Scheduling, Enter Mode - SSEN

| Parameter | Start Byte | Byte Len. | Data Type | Description |
|---|---|---|---|---|
| mode | 19 | 8 | character | STAR IV mode (left justified) |
| text | 27 | 104 | character | image name for use with entering FREEZE mode. |

Notes: 1. The mode specified in this command allows RESET and FREEZE modes to be entered by host command.
2. The image included for FREEZE mode will be displayed.

Script Scheduling, Exit Mode - SSEX

| Parameter | Start Byte | Byte Len. | Data Type | Description |
|---|---|---|---|---|
| mode | 19 | 8 | character | STAR IV mode (left justified) |

Notes: 1. The mode specified in this command allows FREEZE mode to be exited by host command.

Display, switch audio - DISWAU

| Parameter | Start Byte | Byte Len. | Data Type | Description |
|---|---|---|---|---|
| switch_position | 21 | 2 | character | switch position where: "LO" = local "S1" = sat1 "S2" = sat2 |

-continued

CHART 1

"S3" = sat3
"A1" = aux1
"A2" = aux2
"A3" = aux3
"OF" = off

Display, switch video - DISWVI

| Parameter | Start Byte | Byte Len. | Data Type | Description |
|---|---|---|---|---|
| switch_position | 21 | 2 | character | switch position where:<br>"LO" = local<br>"SA" = satellite |

Display, switch device - DISWDE

| Parameter | Start Byte | Byte Len. | Data Type | Description |
|---|---|---|---|---|
| switch_position | 21 | 2 | character | switch position where:<br>"ON" = on<br>"OF" = off |
| device_num | 23 | 2 | integer | device number (1-8) |

Display, switch relay - DISWRE

| Parameter | Start Byte | Byte Len. | Data Type | Description |
|---|---|---|---|---|
| switch_position | 21 | 2 | character | switch position where:<br>"ON" = on<br>"OF" = off |

PTT Load - PTLO

| Parameter | Start Byte | Byte Len. | Data Type | Description |
|---|---|---|---|---|
| aliasname | 19 | 18 | character | The name of a script to be loaded (a) in place of the PTT show in STARs which do not subscribe to PTT and (b) on the primary graphics board in dual-graphics STARs to run concurrently with the PTT show. |

Event, Set Event - EVSE

| Parameter | Start Byte | Byte Len. | Data Type | Description |
|---|---|---|---|---|
| eventname | 19 | 18 | character | event name (left justified) |

Notes: 1. This command permits events to be triggered from the host computer.

PTT Start - PTST
No parameters.
Real Time Cold Load - RTCL
No parameters.

A.1.3 Software Management Messages

```
SW a# aaaaaa   ST   CPU start_address number_bytes version
               MO   CPU sequence_number object_code
               SY   CPU sequence_number object_code
               CL
               IN
               EN
```

The update procedure is started on an ST message. The CPU field indicates which processor the update is for by specifying the main or graphics CPU. The start address is a binary number indicating the starting address of the following MO or SY messages. Number-bytes indicate the number of bytes in the message to follow and version indicates the version number of the update.

Module updates are distinguished from system updates to ensure that a "cold" STAR will not attempt to start on the completion of a module update. The update procedure continues with the receipt of one or more MO or SY messages in sequence. The sequence number is a 24 bit number occupying 4 bytes, starting at 1 and proceeding in ascending order to the last record. Interleaving of MO and SY messages will also abort the update. The object-machine-code is a fixed length 96 byte field in a binary representation of the executable code. The address for this image data may be derived from the formula:

(sequence-number-1)*96 + start-address

If a program module is transmitted over several data frames, only the last frame may contain less than 96 bytes.

Start of Transmission - ST

| Parameter | Start Byte | Byte Len. | Data Type | Description |
|---|---|---|---|---|
| CPU | 13 | 2 | character | identifies the destination CPU. 'MA' for main memory, 'GR' for graphics memory. |

CHART 1 -continued

| Parameter | Start Byte | Byte Len. | Data Type | Description |
|---|---|---|---|---|
| start_address | 15 | 4 | integer | start address of the object code to follow |
| number_bytes | 19 | 4 | integer | number of bytes in the object code to follow |
| version | 23 | 2 | integer | version number |
| current flag | 25 | 2 | integer | current software version 0 = new software system. Non Zero = current software system |

Module Update - MO

| Parameter | Start Byte | Byte Len. | Data Type | Description |
|---|---|---|---|---|
| CPU | 13 | 2 | character | identifies the destination CPU. 'MA' for main memory, 'GR' for graphics memory. |
| sequence_number | 15 | 4 | integer | ordinal value of this data frame within entire message |
| object_code | 19 | 96 | binary | up to 96 bytes of object code |

System Update - SY

| Parameter | Start Byte | Byte Len. | Data Type | Description |
|---|---|---|---|---|
| CPU | 13 | 2 | character | identifies the destination CPU. 'MA' for main memory, 'GR' for graphics memory. |
| sequence_number | 15 | 4 | integer | ordinal value of this data frame within entire message |
| object_code | 19 | 96 | binary | up to 96 bytes of object code |

Clear System Storage - CL
No parameters.
Inhibit Software Updates - IN
No parameters.
Enable Software Updates - EN
No parameters.
A.1.4 Tabular Data
TA a# aaaaaa    For NWS Tabular Data
A.1.5 Image Management Messages

| IM a# aaaaaa | HR | image_name, image_owner, sequence_number, image_data |
|---|---|---|
| | MR | image_name, image_owner, sequence_number, image_data |
| | LR | image_name, image_owner, sequence_number, image_data |
| | HM | image_name, image_owner, sequence_number, image_data |
| | MM | image_name, image_owner, sequence_number, image_data |
| | LM | image_name, image_owner, sequence_number, image_data |
| | HS | image_name, image_owner, sequence_number, image_data |
| | MS | image_name, image_owner, sequence_number, image_data |
| | LS | image_name, image_owner, sequence_number, image_data |
| | GP | image_name, image_owner, sequence_number, image_data |
| | TP | image_name, image_owner, sequence_number, image_data |
| | FO | image_name, image_owner, sequence_number, image_data |
| | SE | (font_number, font_image_name), (font_number, font_image_name), ... |
| | DE | image_type, image_name |
| | CP | image_name, image_owner, sequence_number, image_data |

High Resolution Raster Image Data - HR

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields |

CHART 1 -continued

| Parameter | Start Byte | Byte Len. | Data Type | Description |
|---|---|---|---|---|
| sequence_number | 23 | 2 | integer | "xxxxyyyy" where xxxx defines the source (1000 = Host and 1100 = Local) and where yyyy defines the version number (0 to 15) of the image transmission sequence number, is a value of 1 for the first transmission of the image data and is incremented by 1 for subsequent transmissions. The top bit of the high order byte will be used to flag the end of a transmission. |
| image_data | 25 | 104 | — | run length encoded raster image data |

Medium Resolution Raster Image Data - MR

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | run length encoded raster image data |

Low Resolution Raster Image Data - LR

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | run length encoded raster image data |

High Resolution Map Raster Image Data - HM

| Parameter | Start Byte | Byte Len. | Data Type | Description |
|---|---|---|---|---|

CHART 1 -continued

| | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | run length encoded raster image data |

Medium Resolution Map Raster Image Data - MM

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | run length encoded raster image data |

Low Resolution Map Raster Image Data - LM

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the |

-continued

CHART 1

| Parameter | Start Byte | Byte Len. | Data Type | Description |
|---|---|---|---|---|
| image_data | 25 | 104 | — | run length encoded raster image data; end of a transmission. |

High Resolution Supergraphics Map Raster Image Data - HS

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | run length encoded raster image data |

Medium Resolution Supergraphics Map Raster Image Data - MS

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | run length encoded raster image data |

Low Resolution Supergraphics Map Raster Image Data - LS

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image |

CHART 1 -continued

| Parameter | Start Byte | Byte Len. | Data Type | Description |
|---|---|---|---|---|
| image_data | 25 | 104 | — | data and is incremented by 1 for subsequent transmissions. The top bit of the high order byte will be used to flag the end of a transmission. run length encoded raster image data |

Graphics Program - GP

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | graphics primitives |

Text Page Image - TP

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | see below |

Text page image_data must be transmitted in the following format and order:
image_data = display_type, num_text_lines
              (line attributes, text_line_len, text)
              (line attributes, text_line_len, text)
              (line attributes, text_line_len, text)
              .
              .

This data may be transmitted over one or several message frames as required. Fields are described below:

| Parameter | Byte Len. | Data Type | Description |
|---|---|---|---|
| Display_type | 2 | character | manner in which page is to be displayed: "VE" = vertical scroll |

-continued

CHART 1

| Parameter | Byte Len. | Data Type | Description |
|---|---|---|---|
| | | | "HO" = horizontal scroll |
| | | | "PL" = placed |
| num_text_lines | 2 | integer | number of text lines in text page |
| line attributes: | | | |
| color | 1 | 8 bit integer | pixel value for text color |
| border | 1 | 8 bit integer | pixel value for text border color |
| shadow | 1 | 8 bit integer | pixel value for text shadow color |
| background | 1 | 8 bit integer | pixel value for text background color |
| font | 1 | 8 bit integer | font number |
| slant | 2 | character | slanting "ON" = on; "OF" = off |
| prop_spacing | 2 | character | proportional spacing "ON" = on; "OF" = off |

For Display-types "VE" and "PL" the remaining fields are:

| Parameter | Byte Len. | Data Type | Description |
|---|---|---|---|
| text_line_len | 1 | short | number of character bytes in text line |
| text | 0-max char/line | character | text characters for line (number depends on value of text_line_len) |

For Display-type "HO" the remaining fields are:
(Note: previous field num_text_lines = 1)

| | | | |
|---|---|---|---|
| text_line_len | 2 | integer | number of character bytes in crawl text |
| text | 1-16000 | character | text characters for crawl (number depends on value of text_line_len) |

Font data - FO

| Parameter | Start Byte | Byte Len. | Data Type | Description |
|---|---|---|---|---|
| image_name | 13 | 9 | character | image name of up to 8 characters, terminated by a null character |
| image_owner | 22 | 1 | split | source and version number of the image in two 4 bit sub-fields "xxxxyyyy" where xxxx defines the source (1000 = Host and 1100 = Local) and where yyyy defines the version number (0 to 15) of the image |
| sequence_number | 23 | 2 | integer | transmission sequence number, is a value of 1 for the first transmission of the image data and is incremented by 1 for subsequent transmissions. The top bit of the high order byte will be used to flag the end of a transmission. |
| image_data | 25 | 104 | — | see below |

Font image_data must be transmitted in the following format and order:

image_data = font_x_dim, font_y_dim
   (offset_prop_spacing, char_pixel_descrip,
   char_pixel_descrip, ...)
   (offset_prop_spacing, char_pixel_descrip,
   char_pixel_descrip, ...)
   .
   .
   .
   (offset_prop_spacing, char_pixel_descrip,
   char_pixel_descrip, ...)

Font character descriptions, i.e. (offset_prop_spacing, char_pixel_descrip, char_pixel_descrip, ...), are assumed to be transmitted in the order ASCII 32 to ASCII 127. All 96 character descriptions must be transmitted.

The number of char_pixel_descrip fields per character cell must equal:

font_x_dim * font_y_dim/4 e.g.

x dimension of font = 16

-continued

CHART 1 y dimension of font = 32
16 * 32/4 = 128 char_pixel_descrip fields per character
Font image_data is transmitted over several message frames. The initial frame transmission may contain font_x_dim and font_y_dim only. Data fields are described below.

| Parameter | Byte Len. | Data Type | Description |
|---|---|---|---|
| font_x_dim | 2 | integer | x dimension of pixel map of font characters (20 or 26) |
| font_y_dim | 2 | integer | y dimension of pixel map of font characters (16, 32, 48, or 64) |
| offset_prop_spacing | 1 | short | number of pixels to offset from pixel map center to proportionally space this character |
| char_pixel_descrip | 1 | short | four 2 bit values which, when used in conjunction with text color attributes in effect at time of font character reference, may be individually mapped to pixel values of one byte. |

A.1.6 Font Selection Messages
FS a# aaaaaa    SE num name num name ...
Select foreground fonts - SE

| Parameter | Start Byte | Byte Len. | Data Type | Description |
|---|---|---|---|---|
| font_number | 13 | 2 | integer | reference number of foreground font (range is 1 to 8) |
| font_image_name | 15 | 10 | character | image name of font selected for foreground. Up to 8 characters terminated by a null character. |
| font_number | 25 | 2 | integer | reference number of foreground font (range is 1 to 8) |
| font_image_name | 27 | 10 | character | image name of font selected for foreground. Up to 8 characters terminated by a null character. |
| font_number | 37 | 2 | integer | reference number of foreground font (range is 1 to 8) |
| font_image_name | 39 | 10 | character | image name of font selected for foreground. Up to 8 characters terminated by a null character. |
| font_number | 49 | 2 | integer | reference number of foreground font (range is 1 to 8) |
| font_image_name | 51 | 10 | character | image name of font selected for foreground. Up to 8 characters terminated by a null character. |
| font_number | 61 | 2 | integer | reference number of foreground font (range is 1 to 8) |
| font_image_name | 63 | 10 | character | image name of font selected for foreground. Up to 8 characters terminated by a null character. |
| font_number | 73 | 2 | integer | reference number of foreground font (range is 1 to 8) |
| font_image_name | 75 | 10 | character | image name of font selected for foreground. Up to 8 characters terminated by a null character. |
| font_number | 85 | 2 | integer | reference number of foreground font (range is 1 to 8) |
| font_image_name | 87 | 10 | character | image name of font selected for foreground. |

CHART 1 -continued

| | | | | |
|---|---|---|---|---|
| font_number | 97 | 2 | integer | Up to 8 characters terminated by a null character. reference number of foreground font (range is 1 to 8) |
| font_image_name | 99 | 10 | character | image name of font selected for foreground. Up to 8 characters terminated by a null character. |

Notes:
1. The SE message may contain between 1 and 8 fonts inclusive to be selected for foreground.
2. This command is used for selecting which fonts stored in the Image Database are available for text page access and associating these fonts with a number.

Delete Image - DE

| Parameter | Start Byte | Byte Len. | Data Type | Description |
|---|---|---|---|---|
| image_type | 13 | 2 | character | image type descriptor "HR", "MR", "LR", "HM", "MM", "LM", "HS", "MS", "LS", "FO", "GP", "TP" |
| image_name | 15 | 10 | character | image name of up to 8 characters, terminated by a null character |

A.1.7 List Management Messages

LI a# aaaaaa    AD    (entry_number address_data),(entry_number address_data), ...

CO a# aaaaaa    CD    (entry_number config_data),(entry_number config_data) ...

Address List data - AD

| Parameter | Start Byte | Byte Len. | Data Type | Description |
|---|---|---|---|---|
| entry_number | 13 | 2 | integer | entry number in Address List Table |
| address_data | 15 | 24 | character | four addresses of 6 byte length |
| entry_number | 39 | 2 | integer | entry number in Address List Table |
| address_data | 41 | 24 | character | four addresses of 6 byte length |
| entry_number | 65 | 2 | integer | entry number in Address List Table |
| address_data | 67 | 24 | character | four addresses of 6 byte length |
| entry_number | 91 | 2 | integer | entry number in Address List Table |
| address_data | 93 | 24 | character | four addresses of 6 byte length |

Configuration data - CD

| Parameter | Start Byte | Byte Len. | Data Type | Description |
|---|---|---|---|---|
| entry_number | 13 | 2 | integer | entry number in Configuration Database |
| config_data | 15 | — | — | Configuration Database entry, byte length and data type depend on entry number specified. |
| entry_number | — | 2 | integer | entry number in Configuration Database |
| config_data | — | — | — | Configuration Database entry, byte length and data type depend on entry number specified. |

Notes:
1. Total byte length of Configuration data message not to exceed 1 frame length (128 bytes) and a Configuration Database entry may not be transmitted over 2 message frames.

A.1.8 Clock Management Messages

CU a# aaaaaa    TI year month date day hour minute second

Time - TI

| Parameter | Start Byte | Byte Len. | Data Type | Description |
|---|---|---|---|---|
| year | 13 | 2 | integer | year number (e.g., 1988) |
| month | 15 | 2 | integer | month number (range is 1 to 12) |
| date | 17 | 2 | integer | date number (range is |

-continued
CHART 1

| | | | | |
|---|---|---|---|---|
| day | 19 | 2 | integer | day number (range is 0 to 6, i.e. Sunday to Saturday) 1 to 31) |
| hour | 21 | 2 | integer | hour number (range is 0 to 23) |
| minute | 23 | 2 | integer | minute number (range is 0 to 59) |
| second | 25 | 2 | integer | second number (range is 0 to 59) |

Notes: 1. All clock data will be in GMT.

A.1.9 STAR III Translator Messages
The STAR IV system will identify these messages as STAR III (in accordance with the disclosure of Ser. No. 07/323,089) by the preceding two character bytes "S3".

A.1.10 End of Transmission Messages
An input message is required to terminate a communications session via the modem and RS-232 ports. Receipt of this message will disconnect the phone line if communications are via the modem port.
IO a# aaaaaa ET
where ET specifies end of transmission.

A.1.11 Crawl Management Message
CR a# aaaaaa  AC privilege interval
          DE  privilege
          SC
          CU Activate Schedule - AC

| Parameter | Start Byte | Byte Len. | Data Type | Description |
|---|---|---|---|---|
| privilege | 13 | 2 | character "HO" = host "LO" = local | User privilege |
| interval | 15 | 4 | integer | Scheduling interval in seconds. |

Deavtivate Schedule - DE

| Parameter | Start Byte | Byte Len. | Data Type | Description |
|---|---|---|---|---|
| privilege | 13 | 2 | character "HO" = host "LO" = local | User privilege |

Crawl Schedule - SC

| Parameter | Start Byte | Byte Len. | Data Type | Description |
|---|---|---|---|---|
| privilege | 13 | 2 | character "HO" = host "LO" = local | User privilege |
| crawl_1 | 15 | 10 | character | 1st crawl name |
| crawl_2 | 25 | 10 | character | 2nd crawl name |
| . | | | | |
| . | | | | |
| . | | | | |
| crawl_10 | 105 | 10 | character | 10th crawl name |

Note: Crawl names are up to 8 characters in length terminated by a NULL character.

Select Crawl - CU

| Parameter | Start Byte | Byte Len. | Data Type | Description |
|---|---|---|---|---|
| privilege | 13 | 2 | character "HO" = host "LO" = local | User privilege |
| crawl | 15 | 10 | character | Crawl name |

A.2 OUTPUT MESSAGES
The following messages are defined as output messages from the STAR IV to the host:
  HM Health Monitor
  RA Radar Messages A.2.1 Health Monitor Messages
There are two health messages defined, status report and health log.

HM ppppppp  SR STATUS
              HL LOG pppppp      Physical address of STAR IV unit.

Status Report - SR

| Parameter | Start Byte | Byte Len. | Data Type | Description |
|---|---|---|---|---|
| status | 11 | 20 | character | STAR IV Status Table. |

Log Report - HL

| Parameter | Start Byte | Byte Len. | Data Type | Description |
|---|---|---|---|---|
| event | 11 | 2 | integer | Event number associated with this message |
| count | 13 | 2 | integer | number of occurrences of this event |

-continued

CHART 1

| | Start Byte | Byte Len. | Data Type | Description |
|---|---|---|---|---|
| timetag | 15 | 19 | character | time of the first occurrence. The timetag has the format yyyy/mm/dd/hh:mm:ss |
| message | 21 | 30 | character | message associated with this event |

A.2.2 NODATA/NOVIDEO Messages

The following message provides notification of 2 hours, 45 minutes in the specified STAR IV mode.

ss pppppp NO MESSAGE
        where ppppppp is the physical STAR IV address and MESSAGE is:

| Parameter | Start Byte | Byte Len. | Data Type | Description |
|---|---|---|---|---|
| mode | 11 | 4 | character | STAR IV mode NODA - NODATA NOVI - NOVIDEO |
| timetag | 15 | 19 | character | time of host notification |

The foregoing is for purposes of describing and illustrating a preferred embodiment of the present invention. It will be apparent to those skilled in the art that modifications to the invention described herein may be made without departing from its scope or spirit, including without limitation: modification of hierarchical addressing groupings and schemes, programming content, structure, format, syntax, sequence, and organization of data processed by the system disclosed, operating modes, and number and nature of video, audio, and data inputs and outputs. In addition, the software described herein is open-ended and may be processed by any suitable processor, including machines containing 68000-family processors, so that apparatus 10 may be an appropriately modified personal computer such as the Commodore Amiga or any other appropriate device. Apparatus 10 may be designed to accept other central processors should the need arise, and the scripts, programs, and other messages and commands may be written in different ways than those described herein.

We claim:

1. A communications system having a transmitter, comprising a plurality of hierarchically addressable receivers adaptable to receive and process transmissions from the transmitter, which transmissions include an indexed address list in which the index corresponds to a characteristic of at least one receiver, for permitting each receiver to identify its addresses, instructions, and data requirements.

2. A communications system according to claim 1 in which the transmissions further comprise means for altering operational modes of the receivers addressed.

3. A communications system according to claim 2 in which the altering means comprises a sequence of commands capable of being processed by the receivers addressed.

4. A communications system according to claim 1 in which at least one receiver comprises means for receiving at least one signal transmitted via satellite, which signal is selected from the group of signals consisting of video signals, audio signals, and digital data signals.

5. A communications system according to claim 4 in which the digital data signals represent information selected from the group consisting of alpha-numerics, graphics primitives, raster graphics, modified format videotext, clock, programs, lists, and scripts.

6. A communications system according to claim 5 in which the lists are selected from the group consisting of address lists and operational lists.

7. A communications system according to claim 5 in which the scripts comprise lists of commands addressable to at least one receiver.

8. A communications system according to claim 1 in which the receiver is capable of demodulating a frequency shift keyed data subcarrier.

9. A communications system according to claim 1 in which the receiver is capable of operating in a first mode until the occurrence of an event selected from the group consisting of non-receipt of a valid data packet for a preselected period of time, loss of video signals for a preselected number of consecutive video fields, and receipt of data signals forcing operation in a mode other than the first mode.

10. A communications system according to claim 1 in which the receiver comprises means for receiving at least one signal transmitted from a local source, which signal is selected from the group of signals consisting of audio, video, data, telephone, keyboard input, weather sensor input, and auxiliary audio signals.

11. A communications system according to claim 10 in which the weather sensor input signals represent information selected from the group consisting of temperature, humidity, wind direction and speed, rainfall, and barometric pressure information.

12. A communications system comprising:
  a. a transmitter for periodically transmitting first audio, video, and data signals via satellite;
  b. means for providing second signals selected from the group consisting of audio, video, and data signals;
  c. memory means associated with the transmitter; and
  d. a plurality of hierarchically addressable receivers remote from the transmitter, each of which receivers comprises:
    i. means for receiving and processing the first audio, video, and data signals transmitted form the transmitter via satellite;
    ii. means for processing and storing the second signals;
    iii. means for outputting the processed first and second signals; and
    iv. means, to which the outputting means is responsive, for altering the output of the outputting means if no transmissions from the transmitter are received by the receiving and processing means within a preselected period of time;

at least one of which transmissions from the transmitter includes (1) a first address corresponding to a characteristic of at least one receiver, (2) a second address corresponding on a 1:1 basis with the first address, with first and second addresses are stored in the memory means in their corresponding relationship, (3) a list containing periodically variable addresses corresponding on an n:1 basis with the second address, where n is an integer having a value of at least one, for permitting the at lest one receiver having the characteristic to identify its periodically variable addresses, and (4) instructions for processing the first and second signals.

13. A communications system having a transmitter, comprising a plurality of addressable receivers adaptable to receive and process periodic transmissions from the transmitter, at least one of which transmissions includes (1) a first address corresponding to a characteristic of at least one receiver, (2) a second address corresponding on a 1:1 basis with the first address, and (3) a list containing periodically variable addresses corresponding on an n:1 basis with the second address, where n is an integer having a value of at least one, for permitting the at least one receiver having the characteristic to identify its periodically variable addresses.

14. A communications system according to claim 13 further comprising memory means associated with the transmitter for containing the first and second addresses in their corresponding relationship.

15. A communications system according to claim 14 in which (1) at least one of the transmissions includes addresses for each of the plurality of receivers and instructions for changing the operating parameters of each of the addressed plurality of receivers and (2) the plurality of receivers are addressable hierarchically.

16. A communications system having a transmitter, comprising a plurality of receivers adaptable to receive and process transmissions from the transmitter, which transmissions convey first information related to a fixed characteristic of a first one of the plurality of receivers and second, at least periodically variable, information indexed to the first information, which second information permits the first receiver to identify and process conveyed third information intended for it while precluding at least one other of the plurality of receivers from processing the third information.

17. A method for communicating comprising the steps of:
  a. providing a first transmitter for periodically transmitting audio, video, and data signals via satellite;
  b. providing a second transmitter for transmitting signals selected from the group consisting of audio, video, and data signals;
  c. providing memory means associated with the first transmitter; and
  d. providing a plurality of hierarchically addressable receivers remote from the first transmitter, each of which receivers comprises:
    i. means for receiving and processing the audio, video, and data signals transmitted from the first transmitter via satellite;
    ii. means for processing and storing the signals transmitted from the second transmitter;
    iii. means for outputting the processed signals transmitted from the first and second signals; and
    iv. means, to which the outputting means is responsive, for altering the output of the outputting means if no transmissions from the first transmitter are received by the receiving and processing means within a preselected period of time; and
  e. transmitting at least one transmission from the first transmitter which includes (1) a first address corresponding to a characteristic of at least one receiver, (2) a second address corresponding on a 1:1 basis with the first address, which first and second addresses are stored in the memory means in their corresponding relationship, (3) a list containing periodically variable addresses corresponding on an n:1 basis with the second address, where n is an integer having a value of at least one, for permitting the at least one receiver having the characteristic to identify its periodically variable addresses, and (4instructions for processing the signals transmitted from both the first and second transmitters.

* * * * *

UNITED STATES PATENT AND TRADEMARK OFFICE
CERTIFICATE OF CORRECTION

PATENT NO. : 5,140,419            Page 1 of 2

DATED : August 18, 1992

INVENTOR(S) : Galumbeck et al.

It is certified that error appears in the above-identified patent and that said Letters Patent is hereby corrected as shown below:

Cover page, right-hand column, line 3, delete "1974" and insert --1976--

Column 7, line 31, delete "Aloha-Numerics" and insert --Alpha-Numerics--

Column 7, line 41, delete "G.0.E.S." and insert --G.O.E.S.--

Column 10, line 44, delete "9" and insert --9.--

Column 12, line 17, delete "although" and insert --(although--

Column 17, continuation of Chart 1, line 4, delete "soriptname" and insert --scriptname--

Column 37, continuation of Chart 1, line 35, delete "Deavtivate" and insert --Deactivate--

Column 40, line 60, delete "form" and insert --from--

Column 41, line 7, delete "with" and insert --which--

UNITED STATES PATENT AND TRADEMARK OFFICE
CERTIFICATE OF CORRECTION

PATENT NO. : 5,140,419

DATED : Auugst 18, 1992

INVENTOR(S) : Galumbeck et al.

It is certified that error appears in the above-identified patent and that said Letters Patent is hereby corrected as shown below:

Column 42, line 41, delete "(4instructions" and insert --
(4) instructions--.

Signed and Sealed this

Twenty-first Day of September, 1993

Attest:

BRUCE LEHMAN

Attesting Officer

Commissioner of Patents and Trademarks